United States Patent
Garcia Biosca et al.

(10) Patent No.: US 8,679,343 B2
(45) Date of Patent: Mar. 25, 2014

(54) REVALUATION OF AQUEOUS WASTE STREAMS IN THE PROPYLENE OXIDE/STYRENE CO-PRODUCTION PROCESS

(75) Inventors: Eva Maria Garcia Biosca, Madrid (ES); Ignacio Rivera Sarmiento, Madrid (ES); Belén Mula Andres, Madrid (ES); Jorge Rodriguez Bustamante, Madrid (ES); Maria Pilar De Frutos Escrig, Madrid (ES)

(73) Assignee: Repsol S.A. (ES)

( * ) Notice: Subject to any disclaimer, the term of this patent is extended or adjusted under 35 U.S.C. 154(b) by 699 days.

(21) Appl. No.: 12/991,977

(22) PCT Filed: May 14, 2008

(86) PCT No.: PCT/ES2008/070093
§ 371 (c)(1),
(2), (4) Date: Jan. 6, 2011

(87) PCT Pub. No.: WO2009/138530
PCT Pub. Date: Nov. 19, 2009

(65) Prior Publication Data
US 2011/0121228 A1 May 26, 2011

(51) Int. Cl.
*B01D 11/04* (2006.01)
*C02F 1/26* (2006.01)
(52) U.S. Cl.
USPC ............ 210/639; 210/634; 210/749; 210/752
(58) Field of Classification Search
USPC .................................. 210/634, 639, 749, 752
See application file for complete search history.

(56) References Cited

U.S. PATENT DOCUMENTS

| 4,066,835 | A | | 1/1978 | Hahn et al. |
| 4,241,216 | A | | 12/1980 | Bergman et al. |
| 5,210,354 | A | * | 5/1993 | Dubner et al. ............... 585/469 |
| 5,439,657 | A | * | 8/1995 | Wong et al. .................... 423/54 |
| 5,558,778 | A | | 9/1996 | Janssen et al. |
| 5,675,055 | A | | 10/1997 | Evans et al. |
| 5,762,802 | A | | 6/1998 | Carr et al. |
| 5,874,654 | A | | 2/1999 | Gacon-Camoz et al. |
| 6,080,894 | A | * | 6/2000 | Oyague et al. ............... 568/700 |

FOREIGN PATENT DOCUMENTS

| EP | 0616980 A | 9/1994 |
| EP | 0 943 611 | 6/2002 |
| EP | 1 586 568 | 10/2005 |
| GB | 1385356 A | 2/1975 |
| WO | WO 01/32561 A1 | 5/2001 |
| WO | WO 2006/104222 A1 | 10/2006 |

OTHER PUBLICATIONS

International Search Report dated Feb. 23, 2009, issued in corresponding international application No. PCT/ES2008/070093.

* cited by examiner

*Primary Examiner* — Peter F Godenschwager
(74) *Attorney, Agent, or Firm* — Ostrolenk Faber LLP

(57) ABSTRACT

The present disclosure describes a method for the revaluation of aqueous waste streams generated in the propylene oxide and styrene co-production processes. In particular, it discloses a method of reducing the organic contaminant load from a highly contaminated aqueous stream and recovery from said stream of organic compounds that may be recirculated or used as fuel in the co-generation of energy, and which comprises: acidification of said aqueous stream with inorganic acid at a pH less than 4.5; separation of the two resulting phases at a temperature greater than 40° C.; washing of the organic phase produced in the previous step with an aqueous solution of excess acid and separation of the two resulting phases.

10 Claims, 3 Drawing Sheets

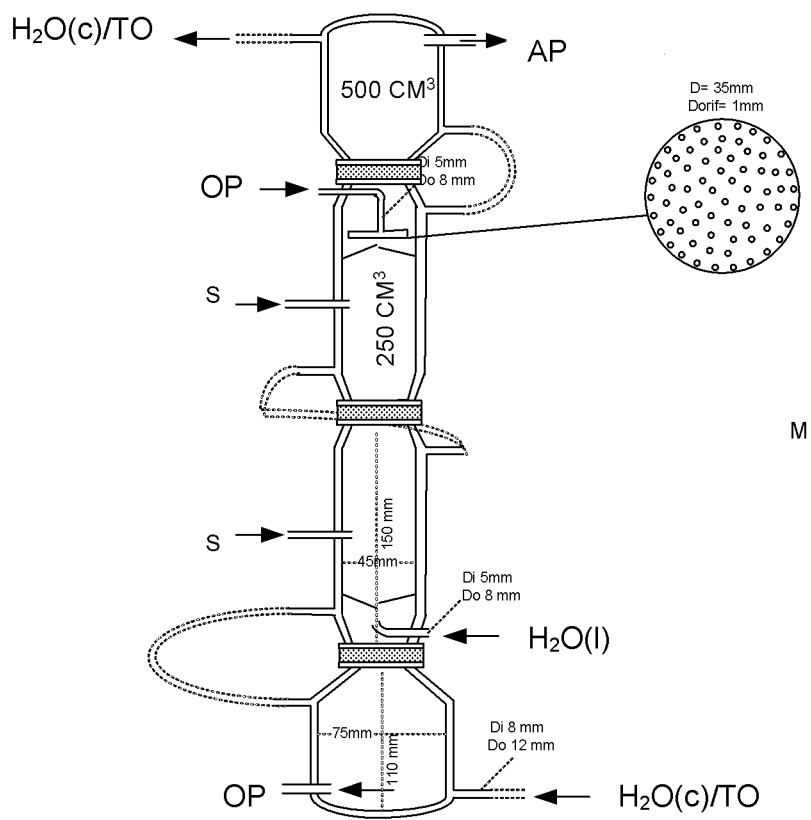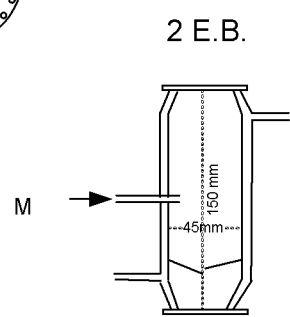
Fig. 2A
Fig. 2B

REVALUATION OF AQUEOUS WASTE STREAMS IN THE PROPYLENE OXIDE/STYRENE CO-PRODUCTION PROCESS

CROSS REFERENCE TO RELATED APPLICATIONS

The present application is a 35 U.S.C. §371 National Phase conversion of PCT/ES2008/070093, filed May 14, 2008, the disclosure of which is incorporated herein by reference. The PCT International Application was published in the Spanish language.

The present invention relates to a method for the revaluation of aqueous waste streams generated in the propylene oxide and styrene co-production processes. In particular, it discloses a process of reduction of the organic contaminant load from a highly contaminated aqueous stream and recovery from said stream of organic compounds which may be recirculated or used as fuel in the co-generation of energy.

PRIOR ART

The propylene oxide and styrene co-production process is fundamentally based on the following stages: a) reaction of ethylbenzene with oxygen to form ethylbenzene hydroperoxide, b) reaction of the ethylbenzene hydroperoxide with propylene in the presence of a catalyst to form propylene oxide and methylbenzyl alcohol and c) dehydration of the methylbenzyl alcohol for the production of styrene.

In the two first stages acid and phenolic compounds are formed which, together with the catalyst used in the epoxidation, it is necessary to eliminate so that they do not interfere downstream of the process and could give rise to problems in columns and reactors after epoxidation, for which reason it is totally essential to perform an alkaline washing of the epoxidation outlet stream.

This alkaline washing produces an aqueous stream, also called alkaline purge, highly loaded in organic compounds and sodium which can be taken integrally to water treatment, without any prior pre-treatment, which permits the recovery of organic matter. The typical composition of the alkaline purge is included between values of 4 and 8% of compounds of alcoholic nature, largely monopropylene glycol and methylbenzyl alcohol, between values of 3 and 6% of organic salts, largely sodium benzoate and phenolate and a content greater than 2% of sodium hydroxide.

The purification treatment of waste water arising in the process of propylene oxide and styrene is very expensive, mainly due to three aspects: its high content in organic matter which is translated into a high value of the chemical oxygen demand (COD greater than 40% by weight), the high flow of said stream and, finally, the fact that it contains organic compounds which are not easily degradable.

All of the above originates two problems to the overall process, on the one hand an expensive treatment is necessary consisting of incineration, damp oxidation at high temperatures and pressure with oxygen or biological treatment or, more typically, a combination of several of these three treatments.

On the other hand, the treatments used at present are based on a chemical and/or biological oxidation of the organic matter which means that said matter is not recoverable and cannot be reused in the process or used in energy generation processes.

In the bibliography there are alternative treatments to those indicated above although they have drawbacks which make their industrial implementation complicated, for example U.S. Pat. No. 5,558,778A discloses a process for the treatment of the aqueous waste stream which is carried out by the freezing of the salts and filtration thereof and water evaporation processes followed by recovery of the organic component. These cryogenic processes need a considerable consumption of energy and involve complex facilities for the treatment of streams with high flow values.

U.S. Pat. No. 5,675,055A discloses a treatment process of an alkaline stream produced in the propylene oxide and styrene co-production plant, which is carried out by acidification with sulphuric acid followed by extraction with solvent it being possible to either perform or not perform a prior evaporation of aqueous waste and of light compounds. In this method it is necessary to use an organic stream, which may be a waste stream of the actual process, to facilitate the separation of the organic matter. The knowledge of the process allows us to identify said stream as a stream which is obtained by the styrene purification column bottoms and which contains aromatic products of high molecular weight, part of which are known to be precursors of styrene and, which may give rise to the formation of polymers in the form of gums in contact with sulphuric acid, the use of milder acids such as phosphoric acid does not avoid the formation of gums.

International application WO0132561A1 discloses a process wherein the alkaline aqueous stream is subjected to successive evaporations to finally obtain purified water, in this method the evaporation of a very high flow of water would be necessary which would involve great energy consumption and the need for the installation of high capacity distillation columns. On the other hand, and more recently, the international application WO2006104222A1 discloses a process which, although applied to the process of epoxidation of propylene with cumyl hydroperoxide, would also be applicable to the SM/PO process and which is also based on evaporation for the production of an aqueous phase which facilitates its subsequent treatment.

EXPLANATION OF THE INVENTION

The present invention provides a useful tool for the recovery of an aqueous waste stream, from a co-production plant of propylene oxide, styrene and derivatives (SM/PO), by the reduction in the value of the chemical oxygen demand (COD) of aqueous waste streams with high contaminant load and the use of the recovered organic matter, thus increasing the possibilities of industrial recycling thereof and preserving the ecological balance.

Currently, the alkaline purge produced in the process of co-production of SM/PO is subjected, normally, to a treatment wherein the organic matter is destroyed. The high organic matter content makes it necessary to use very strong treatment methods such as wet air oxidation at high temperature with oxygen or incineration. The treatment of the present invention permits the following advantages compared with the methods known in the state of the art:

1.—production of an aqueous stream with less COD content, which makes it possible that said stream can be directly sent to biological treatment without the need for the stage of wet air oxidation, or of incineration or be treated by means of milder techniques such as, for example, advanced oxidation.

2.—recovery of organic matter which, instead of being sent to treatment, with the additional cost this entails, it can be used as a fuel which involves a saving in the consumption of conventional fuel. It is also feasible to reincorporate this organic matter in the actual process of recovering products such as methylbenzyl alcohol or monopropylene glycol.

3.—possibility of recovering the molybdenum which is not possible in an alkaline stream rich in organic salts but it is feasible in an acid stream with a lower organic content.

On the other hand, it is not necessary using the method of the present invention to perform any distillation or cryogenic treatment of said stream. In the method of the invention, the aqueous stream is subjected to consecutive stages of acidification, separation by decantation, washing of the organic phase and further separation by decantation, the overall calculation of these operations being more favourable energetically than the distillation or cryogenic treatment.

Furthermore, compared with processes which use extraction and organic solvents, the present invention has the advantage that it is not necessary to add any additional organic solvent and, if the product used as solvent is a stream which is obtained by styrene purification column bottoms rich in heavy aromatic compounds, in this way it avoids the formation of styrene polymers which polymerize in the form of non-filterable gums causing problems in the phase separation process.

The method of the invention, for the treatment of wastewater from the aqueous stream generated in a SM/PO plant, comprises an acid treatment for the elimination of the organic part of the aqueous phase. This treatment performed in suitable conditions, gives rise to the separation of two phases: an aqueous one with less organic content and an organic one. It has been verified that the separation process is largely influenced by the temperature, determined temperature conditions to achieve a good separation of phases being necessary and that the introduction of organic solvents which decrease the profitability of the process, both due to the possible losses which may be produced and the need for the solvent to be reused in the treatment, is not necessary.

Therefore, a first aspect of the present invention relates to a method for the treatment of an aqueous waste stream, with high sodium and organic compounds content. "High organic compound content" is understood to mean a stream which has a value of chemical oxygen demand higher than 40% by weight. This waste stream from the washing process of the product resulting from the epoxidation of propylene with ethylbenzene hydroperoxide from a SM/PO co-production plant (this aqueous stream also called "alkaline purge"). The treatment comprises the following steps:

a) acidification of the aqueous stream with an inorganic acid at a pH less than 4.5, preferably at a temperature higher than 40° C., more preferably a temperature greater than 50° C. In this acidification treatment two phases, one aqueous and another organic, are produced;

b) separation of the phases, aqueous and organic, formed in step (a), at a temperature greater than 40° C., more preferably at a temperature greater than 50° C. This separation is carried out preferably in a decanter. After this separation, an aqueous phase is produced, wherein the COD reduction is between 30 and 70%, more preferably between 40 and 55%, and an organic stream which drags part of the water and the sodium from the aqueous phase; the water content of the organic phase is between 15 and 25% by weight and, more preferably, between 20 and 22%. On the other hand, the sodium content in the organic phase has values between 3000 and 10000 ppm and, more preferably, between 5000 and 7000 ppm.

c) washing of the organic phase separated in step (b) with an aqueous solution of acid. On washing the organic phase, an aqueous phase is again generated, but it is achieved that the organic component which is again dissolved in the water is minimum. The aqueous phase has a much lower organic content for which reason alternatives may be considered which are less expensive such as, for example, its direct biological treatment or treatment by advanced oxidation without the need for performing an exhaustive oxidation, wet air-type oxidation or incineration. It is possible to combine the aqueous phase produced in the washing of step (c) with the aqueous phase produced in the acid treatment of the alkaline purge of step (b), for its subsequent treatment, so that the elimination of total COD of the treatment, bearing in mind both stages, is between 26 and 66% and more preferably between 36 and 51%.

d) separation of the organic phase produced in step (c), preferably this separation is carried out by decanters and use of said phase to be reincorporated in the process in order to recover methylbenzyl alcohol and monopropylene glycol or, more preferably, as fuel in the energy co-generation boilers.

On the other hand, through the method of the invention, there is also the possibility of recovering the molybdenum from the aqueous phase separated in step (b) by any method known by a person skilled in the art, such as, for example, the use of ion exchange resins, which is not possible in an alkaline stream rich in organic compounds, but it is feasible in an acid stream with lower content in said compounds. In this way, as the aqueous phase remains with a low organic compound content, it is possible to recover the molybdenum, used as catalyst in the co-production of SM/PO, which is impossible in the alkaline purge since both the neutral organic compounds and the sodium salts interfere.

The organic matter produced in step (d) can be used as fuel in a co-generation process instead of being sent to treatment, which produces two types of savings: on the one side this organic matter does not have to be treated and, on the other, the reuse of said organic matter in the SM/PO co-production process as fuel, decreasing the quantity of conventional fuel necessary in said process.

The composition of the organic matter produced in step (b) does not make feasible its immediate use as fuel, as it has a high salt and water content, but the washing of this organic phase with an acid aqueous solution, enables the organic phase produced in step (d) to remain with a low sodium and water content it being possible to be used directly as a fuel. It is important that the washing solution is an acid solution to minimize a new extraction of organic matter towards the aqueous phase, the use of organic or inorganic acids being possible, although, with the aim of minimizing the organic charge of the aqueous phase, the use of inorganic acids is preferable and, more preferably, the use of sulphuric acid since it is the same acid used in the first stage of the treatment. The water/organic phase ratio to be used can be between 1/2 and 3/1, more preferably between 1/1 and 2/1. The acid solution used should have excess acid between 3 and 6% by weight and, more preferably between 4.5 and 5.5% by weight.

The organic phase produced in step (b) can have a water content between 15 and 25% by weight and more preferably between 20 and 22% by weight and a sodium content between 3000 and 10000 ppm, more preferably between 5000 and 7000 ppm. Bearing in mind that the sodium content is due to waste water in step (b) after performing step (a), it is totally necessary to reduce the water content, for which reason, an extraction has been chosen with acid aqueous solution which minimizes the quantity of organic matter which again passes from the organic phase to the aqueous phase. Although the method which seems most suitable for carrying out this step is via a washing in extraction column counter flow, given the less expenditure of washing stream and, therefore, the lower quantity of organic dissolved again in the aqueous phase, it has been verified that this system is inefficient and that, surprisingly, a normal washing with acid solution leads to an extraction value of sodium between 80 and 95%, more preferably between 90 and 95% and the organic load redissolved in the aqueous phase only makes the efficacy of COD reduce by 1 to 5%, more preferably between 2 and 3%. In this way, the organic phase which is obtained after the washing has a sodium content less than 1000 ppm and more preferably less than 500 ppm.

A second aspect of the present invention relates to the organic matter that can be produced by the method of the invention. This organic matter is largely composed of compounds of acid character and alcohols, the main components of acid character being benzoic acid and phenol and the largely alcohol component monopropylene glycol. As minority components we can find light acids (acetic and propionic) and methylbenzyl alcohol. As consequence the composition of this stream its use can be varied its reincorporation being possible at some stage of the process for the recovery or valuable compounds, fundamentally monopropylene glycol and methylbenzyl alcohol.

A more preferred use to avoid the reincorporation in the process of acid products, is using this organic matter as fuel in energy co-generation boilers. Said use makes it possible for us to reuse this organic matter reducing the consumption of conventional fuel between 5% and 20% and, more preferably, between 5% and 10% depending on the flow of organic matter which is generated in accordance with the conditions of the overall process.

Therefore, another aspect of the present invention relates to the use of organic matter of the invention as fuel, and more preferably as fuel in energy co-generation boilers.

Throughout the description and the claims the word "comprises" and its variants does not aim to exclude other technical characteristics, additives, components or steps. For persons skilled in the art, other objects, advantages and characteristics of the invention will be gathered in part from the description and in part from the practice of the invention. The following examples and figures will be provided by way of illustration and it is not intended that they are limitative of the present invention.

BRIEF DESCRIPTION OF THE FIGURES

FIG. 2A.—Represents the continuous washing of the organic phase (OP) in extraction column. Where: $H_2O(c)$ is hot water, TO is thermal oil, S is sample taking, $H_2O(l)$ is washing water. FIG. 2B.—Represents two extra bodies (2 E.B.).

EXAMPLES

Figure 1:
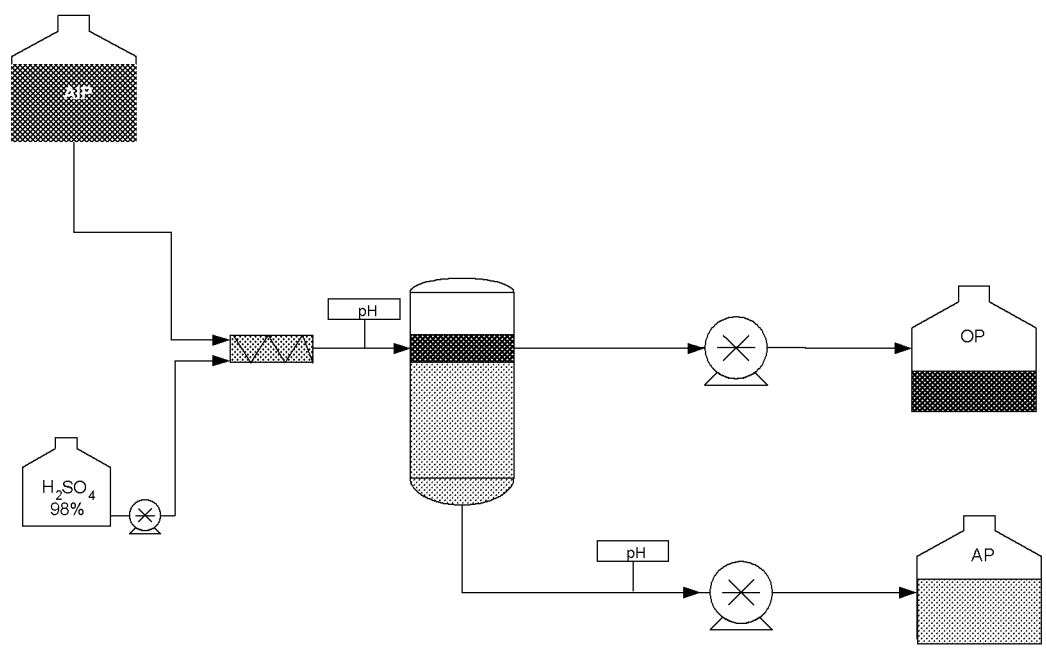
FIG. 1.—Represents a continuous alkaline purge treatment facility (AlP) with sulphuric acid ($H_2SO_4$).

Below the invention will be illustrated by tests carried out by the inventors, which discloses the effectiveness of the method of the invention.

The examples called comparative have been carried out outside the conditions described in the present invention and demonstrate that the best results are achieved by applying the present invention. All the examples, unless indicated otherwise, will start with a stream which was formed on washing the stream which exited the epoxidation and which contained approximately the following average composition expressed in % by weight: water (80%), benzaldehyde (1.5%), monopropylene glycol (5%), methylbenzyl alcohol (0.5%), sodium hydroxide (2%), sodium phenolate (2%), sodium benzoate (2.5%), sodium formiate (1.5%), sodium propionate (0.5%), sodium acetate (1%) and organic compounds of polymeric nature which we will call heavy (3.5%). Furthermore, this aqueous stream contains molybdenum which is used in the previous stages as a catalyst in an approximate proportion of 0.5%. The COD content of the stream is 48.5%.

Comparative Example 1a

Treatment of the Alkaline Purge and Column Bottoms with Sulphuric Acid at 60° C.

A mixture of 100 grams of alkaline purge and 10 grams of styrene purification column bottoms largely composed of heavy aromatic derivatives was acidified with sulphuric acid concentrated at 60° C. until reaching a final pH of 4. After the acidification the formation of gums was observed which made a subsequent treatment impossible including filtration. The analysis of the gums revealed that they were largely styrene polymers.

Comparative Example 1b

Treatment of the Alkaline Purge and Column Bottoms with Sulphuric Acid at 25° C.

The treatment of comparative example 1a was repeated doing so at ambient temperature. The result observed was exactly the same observing the formation of gums and no subsequent treatment being possible.

Comparative Example 1c

Treatment of the Alkaline Purge with Sulphuric Acid Followed by Addition of Column Bottoms 100 grams of alkaline purge were acidified with sulphuric acid concentrated at 60° C. until reaching a final pH of 4. After the acidification the mixture was taken to an lagged decanter at 60° C. and it was left to decant during half an hour. The phases were later separated obtaining 11 grams of organic phase (upper phase) and 89 grams of aqueous phase (lower phase). The organic phase was separated and was mixed at ambient temperature with 10 grams of column bottoms which largely contained heavy aromatic compounds and, on doing so, gums were formed which meant the sample could not be treated with any method including filtration. The analysis of the gums revealed that they were largely styrene polymers.

Comparative Example 1d

Treatment of the Alkaline Purge and Column Bottoms with Phosphoric Acid at 25° C.

A mixture of 100 grams of alkaline purge and 10 grams of column bottoms composed largely of heavy aromatic compounds was acidified with phosphoric acid concentrated at 25° C. until reaching a final pH of 4. After the acidification the formation of gums was observed which made a later treatment including filtration impossible. The analysis of the gums revealed that they were largely styrene polymers.

Comparative Example 2a

Treatment of the Alkaline Purge with Sulphuric Acid at 25° C.

100 grams of alkaline purge were acidified with sulphuric acid concentrated at 25° C. until reaching a final pH of 4. After the acidification the mixture was taken to a decanter and was left to decant at 25° C. during half an hour. After this time no phase separation was observed making the separation thereof impossible.

Comparative Example 2b

Treatment of the Alkaline Purge with Sulphuric Acid at 40° C.

100 grams of alkaline purge were acidified with sulphuric acid concentrated at 40° C. until reaching a final pH of 4. After the acidification the mixture was taken to a decanter and was left to decant at 40° C. during half an hour. After this time, three different phases were observed with interfaces between them, the separation thereof not being possible.

Comparative Example 2c

Treatment of the Alkaline Purge with Sulphuric Acid at 25° C. Followed by Addition of Methyl-Tert-Butyl Ether Comparative example 2a was repeated and, after the acidification methyl-tert-butyl ether was added until observing phase separation; this occurs when 20 grams of solvent have been added.

Comparative Example 2d

Treatment of the Alkaline Purge with Sulphuric Acid at 25° C. Followed by Addition of Methyl Isobutyl Ketone Comparative example 2a was repeated and, after the acidification methyl isobutyl ketone was added until observing phase separation; this occurred when 20 grams were added.

Example 1a

Treatment of the Alkaline Purge with Sulphuric Acid at 60° C. at pH 6

100 grams of alkaline purge were added with sulphuric acid concentrated at 60° C. until reaching a final pH of 6. After the acidification the mixture was taken to an lagged decanter at 60° C. and was left to decant for half an hour. After this time, phase separation was not observed.

Example 1b

Treatment of the Alkaline Purge with Sulphuric Acid at 60° C. at pH 5.5

100 grams of alkaline purge were acidified with sulphuric acid concentrated at 60° C. until reaching a final pH of 5.5. After the acidification the mixture was taken to an lagged decanter at 60° C. and it was left to decant for half an hour. Later the phases were separated producing 5 grams of organic phase (upper phase) and 95 grams of aqueous phase (lower phase). The COD reduction produced in the aqueous phase was 38% and the organic phase produced has a water content of 28.24% and a sodium content of 16775 ppm.

Example 1c

Treatment of the Alkaline Purge with Sulphuric Acid at 60° C. at pH 5

100 grams of alkaline purge were acidified with sulphuric acid concentrated at 60° C. until reaching a final pH of 5. After the acidification the mixture was taken to an lagged decanter at 60° C. and it was left to decant for half an hour. Later the phases were separated producing 6.2 grams of organic phase (upper phase) and 93.8 grams of aqueous phase (lower phase). The COD reduction produced in the aqueous phase was of 39.5% and the organic phase produced had a water content of 27.45% and a sodium content of 15245 ppm.

Example 1d

Treatment of the Alkaline Purge with Sulphuric Acid at 60° C. at pH 4.5

100 grams of alkaline purge were acidified with sulphuric acid concentrated at 60° C. until reaching a final pH of 4.5. After the acidification the mixture was taken to an lagged decanter at 60° C. and it was left to decant for half an hour. Later the phases were separated producing 8.1 grams of organic phase (upper phase) and 93.8 grams of aqueous phase (lower phase). The COD reduction produced in the aqueous phase was of 57% and the organic phase produced had a water content of 24.52% and a sodium content of 14.817 ppm.

Example 1e

Treatment of the Alkaline Purge with Sulphuric Acid at 60° C. at pH 4

100 grams of alkaline purge were acidified with sulphuric acid concentrated at 60° C. until reaching a final pH of 4. After the acidification the mixture was taken to an lagged decanter at 60° C. and it was left to decant for half an hour. Later the phases were separated producing 11 grams of organic phase (upper phase) and 89 grams of aqueous phase (lower phase). The COD reduction produced in the aqueous phase was of 63.22% and the organic phase produced had a water content of 17.77% and a sodium content of 8.765 ppm.

Example 1f

Treatment of the Alkaline Purge with Sulphuric Acid at 60° C. at pH 3.5

100 grams of alkaline purge were acidified with sulphuric acid concentrated at 60° C. until reaching a final pH of 3.5. After the acidification the mixture was taken to an lagged decanter at 60° C. and it was left to decant for half an hour. Later the phases were separated producing 12.8 grams of organic phase (upper phase) and 87.2 grams of aqueous phase (lower phase). The COD reduction produced in the aqueous phase was of 67.5% and the organic phase produced had a water content of 15.34% and a sodium content of 6.895 ppm.

Example 2a

Continuous Treatment of the Alkaline Purge with Sulphuric Acid at a pH Between 4.5 and 5

Continuous tests were carried out with the alkaline purge described previously, using the facility described in FIG. 1 by the following method: From two tanks which contained the alkaline purge (AlP) and the sulphuric acid, both products were added to the static mixer using a dosage pump for the sulphuric acid, the alkaline purge dropped by gravity controlling its flow by the use of a valve. At the outlet of said mixer is positioned a pH controller which, in accordance with the outlet pH opens more or less the flow of the dosage pump of the sulphuric acid, the reference pH chosen was 4.5. The flows used of alkaline purge and sulphuric acid were, respectively, 90 and 7.7 kg/h. The acidified mixture passed to a decanter which was at 60° C. and which had two outlets: lower and side, through the lower outlet the aqueous phase (AP) was collected and through the side outlet the organic phase (OP) was collected. The level of the decanter and the residence time therein were controlled by the two dosage pumps which removed both phases of the system. At the outlet of the aqueous phase is a recurrent pH meter whose function is to ensure that the measurement of the first meter is correct taking a variation of 0.5 units of pH higher as good.

In these conditions no separation problems were observed producing a flow of 90.5 kg/h of aqueous phase (average pH value at the outlet of 5) and 7.2 Kg/h of aqueous phase. The COD reduction observed in the aqueous phase was 28%, the sodium content in the organic phase of 17,800 ppm and the water content of the organic phase of 37.5%.

Example 2b

Continuous Treatment of the Alkaline Purge with Sulphuric Acid at a pH Between 4 and 4.5

The same method described in example 2a was followed using a reference value of pH in the controller of 4.0. The average outlet pH of the treated aqueous phase was 4.2. The flows used of alkaline purge and sulphuric acid were respectively 90 and 7.9 kg/h. The phases were separated without problems producing a flow of aqueous phase at the outlet of 89.5 kg/h and of organic phase at the outlet of 8.4 kg/h. The COD reduction observed in the aqueous phase was 33%, the sodium content of the organic phase of 8365 ppm and the water content of the organic phase of 20.8%.

Example 2c

Continuous Treatment of the Alkaline Purge with Sulphuric Acid at a pH Between 3.5 and 4

The same method described in example 2a was followed using a reference value of pH in the controller of 3.5. The average outlet pH of the treated aqueous phase was 3.8. The flows used of alkaline purge and sulphuric acid were respectively 120 and 10.7 kg/h. The phases were separated without problems producing a flow of aqueous phase at the outlet of 118.9 kg/h and of organic phase at the outlet of 12.5 kg/h. The COD reduction observed in the aqueous phase was 39%, the sodium content of the organic phase of 7315 ppm and the water content of the organic phase of 21.7%

Example 2d

Continuous Treatment of the Alkaline Purge with Sulphuric Acid at a pH Between 3 and 3.5

The same method described in example 2a was followed using a reference value of pH in the controller of 3. The average outlet pH of the treated aqueous phase was of 3.5. The flows used of alkaline purge and sulphuric acid were respectively 90 and 8.2 kg/h. The phases were separated without problems producing a flow of aqueous phase at the outlet of 87.2 kg/h and of organic phase at the outlet of 10.2 kg/h. The COD reduction observed in the aqueous phase was 42%, the sodium content of the organic phase of 5335 ppm and the water content of the organic phase of 20.8%.

In this example, both phases were analysed producing the compositions which are indicated below:
Aqueous phase: Water (84%), Sodium sulphate (8.5%), propylene glycols (4.5%), propionic acid (0.5%), acetic acid (0.5%), benzoic acid (0.5%) and heavy (1.5%).

Organic phase: Acetic acid (1.5%), propionic acid (2%), propylene glycols (4%), methylbenzyl alcohol (2%), phenols (26%), benzoic acid (40%), heavy (3%), sodium sulphate (1.5%) and water (20%).

Comparative Example 3

Tests of Continuous Washing of the Organic Phase in Extraction Column

The organic phase produced in example 2d was mixed with the corresponding aqueous solution and it was treated in the column described in FIG. 2 wherein a wash is performed counter flow using a bath temperature of 60° C. The working method is shown in FIG. 2 and is summarized below: In the column were introduced the organic phase (OP) (through the upper inlet) and the corresponding quantity of aqueous phase (AP) (through the lower inlet), the organic phase drops by gravity whilst the aqueous phase tends to rise due to density. In this way, several packings are tested, several organic phase/aqueous phase ratios, several numbers of bodies (which make the contact time vary) and several packings (whose different consistency also influences the contact time). All tests were performed with sulphuric acid solution and the results are found in table 1.

TABLE 1

Tests performed in the extraction column at different ratios with different numbers of bodies and without packing.

| Test | OP/AP RATIO | Bodies | Packing | AP | COD AP (ppm) | % Na OP eliminated |
|---|---|---|---|---|---|---|
| 1 | 1.21 | 2 | No | water | 169,750 | 42.84 |
| 3 | 1.02 | 2 | No | water | 184,000 | 40.95 |
| 4 | 2.12 | 2 | No | water | 205,000 | 38.71 |
| 5 | 4.13 | 2 | No | water | 230,500 | 9.20 |
| 6 | 1.01 | 2 | Vigreux | water | 259,250 | 36.34 |
| 7 | 1.02 | 3 | Vigreux | water | 233,500 | 45.91 |
| 8 | 1.5 | 3 | Rasching | water | 324,750 | 59.79 |
| 9 | 1.09 | 3 | Rasching | Acidified water | 295,500 | 65.77 |
| 10 | 1.02 | 3 | Rasching | Acidified water | 362,500 | 59.97 |
| 11 | 0.92 | 3 | Rasching | 5% excess $H_2SO_4$ | 254,500 | 68.62 |
| 12 | 1.13 | 3 | Rasching | water | 160,000 | 40.33 |

As can be observed, the results in all the cases can be improved since the degree of sodium extraction is deficient, and, especially, no good results are obtained when deficient water is used.

Example 3a

Discontinuous Tests by Washing of the Organic Phase with Sulphuric Acid Using Excess Acid of 5% by Weight, with Phase Ratio 1 and Subsequent Decantation The washing of the organic phase produced was carried out according to example 2d mixing 100 grams of organic phase with 100 grams of an aqueous solution which contained 1.20% by weight of sulphuric acid. The mixture was stirred during fifteen minutes at 60° C. and it was passed to an lagged decanter at this same temperature where it was left to decant for half an hour. Later, the two phases were separated without problems. In the organic phase the elimination of sodium was of 93.75% (330 ppm of sodium in the treated phase) and the COD value of the aqueous washing phase was of 28.6%. This aqueous phase is combined with the aqueous phase produced in the acid treatment of the alkaline purge so that the COD elimination efficiency in the overall treatment comes to be 39%

Example 3b

Discontinuous Tests by Washing of the Organic Phase with Sulphuric Acid Using Excess Acid of 5% by Weight, with Phase Ratio 0.5 and Subsequent Decantation The washing of the organic phase produced was carried out according to example 2d mixing 100 grams of organic phase with 50 grams of an aqueous solution which contained 2.40% by weight of sulphuric acid. The mixture was stirred during fifteen minutes at 60° C. and it was passed to an lagged decanter at this same temperature where it was left to decant for half an hour. Later, the two phases were separated without problems. In the organic phase the elimination of sodium was of 62.33% (2025 ppm of sodium in the treated phase) and the COD value of the aqueous washing phase was 36.1%. This aqueous phase is combined with the aqueous phase produced in the acid treatment of the alkaline purge so that the COD elimination efficiency in the overall treatment comes to be 41%.

Example 3c

Discontinuous Tests by Washing of the Organic Phase with Sulphuric Acid Using Excess Acid of 5% by Weight, with Phase Ratio 0.25 and Subsequent Decantation The washing of the organic phase produced was carried out according to example 2d mixing 100 grams of organic phase with 25 grams of an aqueous solution which contained 4.80% by weight of sulphuric acid. The mixture was stirred during fifteen minutes at 60° C. and it was passed to an lagged decanter at this same temperature where it was left to decant for half an hour. Later, the two phases were separated without problems. In the organic phase the elimination of sodium was of 47.01% (2825 ppm of sodium in the treated phase) and the COD value of the aqueous washing phase was of 42%. This aqueous phase is combined with the aqueous phase produced in the acid treatment of the alkaline purge so that the COD elimination efficiency in the overall treatment comes to be 41.5%.

Example 3d

Discontinuous Tests by Washing of the Organic Phase with Sulphuric Acid Using Excess Acid of 0.7% by Weight, with Phase Ratio 1 and Subsequent Decantation The washing of the organic phase produced was carried out according to example 2d mixing 100 grams of organic phase with 100 grams of an aqueous solution which contained 1.14% by weight of sulphuric acid. The mixture was stirred during fifteen minutes at 60° C. and it was passed to an lagged decanter at this same temperature where it was left to decant for half an hour. Later, the two phases were separated without problems. In the organic phase the elimination of sodium was of 87.67% (650 ppm of sodium in the treated phase) and the COD value of the aqueous washing phase was of 24.4%. This aqueous phase is combined with the aqueous phase produced in the acid treatment of the alkaline purge so that the COD elimination efficiency in the overall treatment comes to be 40%.

Example 3e

Discontinuous Tests by Washing of the Organic Phase with Sulphuric Acid Using Excess Acid of 3.1% by Weight, with Phase Ratio 1 and Subsequent Decantation The washing of the organic phase produced was carried out according to example 2d mixing 100 grams of organic phase with 100 grams of an aqueous solution which contained 1.17% by weight of sulphuric acid. The mixture was stirred during fifteen minutes at 60° C. and it was passed to an lagged decanter at this same temperature where it was left to decant for half an hour. Later, the two phases were separated without problems. In the organic phase the elimination of sodium was of 88.12% (630 ppm of sodium in the treated phase) and the COD value of the aqueous washing phase was of 22.1%. This aqueous phase is combined with the aqueous phase produced in the acid treatment of the alkaline purge so that the COD elimination efficiency in the overall treatment comes to be 40.3%.

Example 3f

Discontinuous Tests by Washing of the Organic Phase with Sulphuric Acid Using Excess Acid of 5.6% by Weight, with Phase Ratio 1 and Subsequent Decantation The washing of the organic phase produced was carried out according to example 2d mixing 100 grams of organic phase with 100 grams of an aqueous solution which contained 1.22% by weight of sulphuric acid. The mixture was stirred during fifteen minutes at 60° C. and it was passed to an lagged decanter at this same temperature where it was left to decant for half an hour. Later, the two phases were separated without problems. In the organic phase the elimination of sodium was of 89.5% (600 ppm of sodium in the treated phase) and the COD value of the aqueous washing phase was of 22.1%. This aqueous phase is combined with the aqueous phase produced in the acid treatment of the alkaline purge so that the COD elimination efficiency in the overall treatment comes to be 40%.

Example 4a

Figure 3:
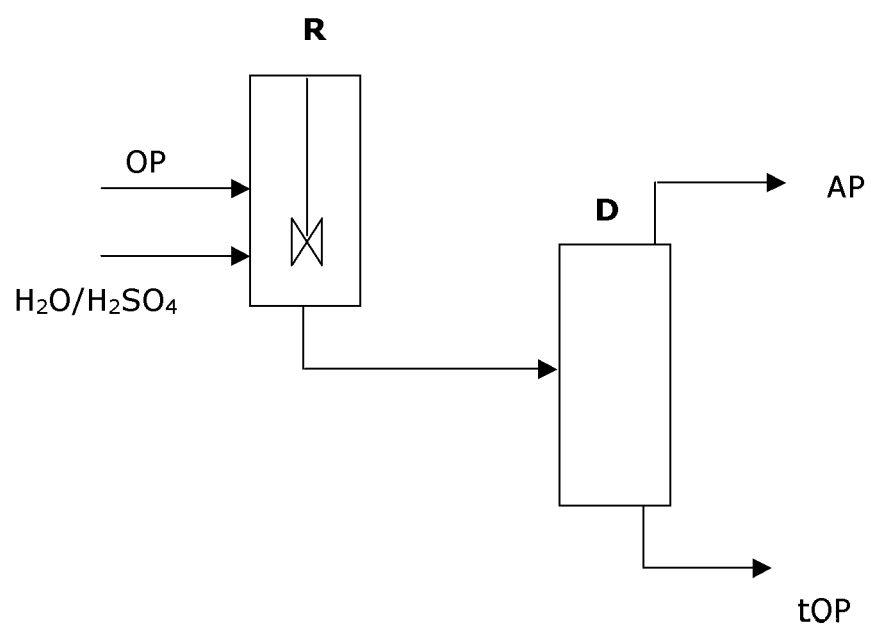
FIG. 3.—Represents a continuous washing diagram and subsequent decantation. Where tOP is treated organic phase.

Tests of Continuous Washing of Organic Phase Using a Phase Ratio of 1.7, Excess Sulphuric of 5% and Subsequent Decantation The washing scheme used is that shown in FIG. 3 and the method is described below. 0.5 Kg of organic phase (OP) produced according to the method described in example 2d and 0.85 Kg of aqueous solution which contained 0.70% by weight of sulphuric acid ($H_2O/H_2SO_4$) were introduced. It was kept stirring for 20 minutes at 60° C. and after that time the lower valve was opened and, simultaneously, the continuous addition of the organic phase was started (flow 1.5 Kg/h) and aqueous solution of sulphuric acid (flow 2.55 Kg/h). After the reactor (R) the mixture passed to a decanter (D) which has a side outlet wherethrough the aqueous phase (AP) exits and a lower outlet whereby the treated organic phase (tOP) exits. The valves of both outlets were regulated for which reason the residence time is approximately 20 minutes. In this way, the two phases were obtained with the following characteristics: in the organic phase an elimination of sodium was achieved of 97% (160 ppm of sodium in the treated organic phase) and the aqueous phase had a COD value of 17.6%. This aqueous phase is combined with the aqueous phase produced in the acid treatment of the alkaline purge so that the COD elimination efficiency in the overall treatment comes to be 38.7%.

Example 4b

Tests of Continuous Washing of Organic Phase Using a Phase Ratio of 1.4, Excess Sulphuric of 5% and Subsequent Decantation The method described used in example 4a was used varying the ratio between the phases. The initial quantity of phases introduced in the reactor was of 0.5 Kg of organic phase produced according to the method described in example 2d and of 0.7 Kg of aqueous solution with a sulphuric acid content of 0.85% by weight. After opening the valve, the introduction of both streams were started with a flow of organic phase and aqueous phase of 1.5 and 2.1 Kg/hour respectively. After the decantation the two phases were obtained with the following characteristics: in the organic phase a sodium elimination was achieved of 91% (480 ppm of sodium in the treated organic phase) and the aqueous phase had a COD value of 23.1%. This aqueous phase is combined with the aqueous phase produced in the acid treatment of the alkaline purge so that the COD elimination efficiency in the overall treatment comes to be 38.2%.

Example 4c

Tests of Continuous Washing of Organic Phase Using a Phase Ratio of 1, Excess Sulphuric of 5% and Subsequent Decantation The method described used in example 4a was used varying the ratio between the phases. The initial quantity of phases introduced in the reactor was of 0.5 Kg of organic phase produced according to the method described in example 2d and of 0.5 Kg of aqueous solution with a sulphuric acid content of 1.20% by weight. After opening the valve, the introduction of both streams were started with a flow of organic phase and aqueous phase of 1.5 and 1.5 Kg/hour respectively. After the decantation the two phases were obtained with the following characteristics: in the organic phase a sodium elimination was achieved of 79% (1120 ppm of sodium in the treated organic phase) and the aqueous phase had a COD value of 22.5%. This aqueous phase is combined with the aqueous phase produced in the acid treatment of the alkaline purge so that the COD elimination efficiency in the overall treatment comes to be 40%.

Example 4d

Tests of Continuous Washing of Organic Phase Using a Phase Ratio of 0.7, Excess Sulphuric of 5% and Subsequent Decantation The method described used in example 4a was used varying the ratio between the phases. The initial quantity of phases introduced in the reactor was of 0.5 Kg of organic phase produced according to the method described in example 2d and of 0.35 Kg of aqueous solution with a sulphuric acid content of 1.7% by weight. After opening the valve, the introduction of both streams were started with a flow of organic phase and aqueous phase of 1.5 and 1 Kg/hour respectively. After the decantation the two phases were obtained with the following characteristics: in the organic phase a sodium elimination was achieved of 74% (1385 ppm of sodium in the treated organic phase) and the aqueous phase had a COD value of 26.7%. This aqueous phase is combined with the aqueous phase produced in the acid treatment of the alkaline purge so that the COD elimination efficiency in the overall treatment comes to be 41%.

Example 4e

Tests of Continuous Washing of Organic Phase Using a Phase Ratio of 0.5, Excess Sulphuric of 5% and Subsequent Decantation The method described used in example 4a was used varying the ratio between the phases. The initial quantity of phases introduced in the reactor was of 0.5 Kg of organic phase produced according to the method described in example 2d and of 0.25 Kg of aqueous solution with a sulphuric acid content of 2.4% by weight. After opening the valve, the introduction of both streams were started with a flow of organic phase and aqueous phase of 1.5 and 0.75 Kg/hour respectively. After the decantation the two phases were obtained with the following characteristics: in the organic phase a sodium elimination was achieved of 65% (1865 ppm of sodium in the treated organic phase) and the aqueous phase had a COD value of 26.7%. This aqueous phase is combined with the aqueous phase produced in the acid treatment of the alkaline purge so that the COD elimination efficiency in the overall treatment comes to be 41.9%.

What is claimed is:

1. Method for the treatment of an alkaline aqueous stream with high organic matter content, from a propylene oxide/styrene production process, which comprises the following steps:
    a. acidification of said alkaline aqueous stream with inorganic acid at a pH less than 4.5;
    b. separation of the two phases resulting in step (a) at a temperature greater than 40° C.;
    c. washing of the organic phase produced in step (b) with an acid aqueous solution, using an excess of acid in relation to the stoichiometric quantity corresponding to the sodium present in the organic phase;
    d. separation of the two phases produced in (c).

2. Method according to claim 1, wherein the acidification of step (a) is carried out with sulphuric acid.

3. Method according to claim 1, wherein the separation of phases from step (b) is performed at a temperature greater than 50° C.

4. Method according to claim 1, wherein the separation of phases from step (b) and/or (d) is carried out by decantation.

5. Method according to claim 1, wherein the acid from step (c) is inorganic acid.

6. Method according to claim 5, wherein the inorganic acid is sulphuric acid.

7. Method according to claim 1, wherein the organic phase/aqueous phase ratio of step (c) is of between 1/2 and 3/1.

8. Method according to claim 7, wherein the organic phase/aqueous phase ratio is of between 1/1 and 2/1.

9. Method according to claim 1, wherein the excess acid from step (c) is of between 3 and 6% by weight.

10. Method according to claim 9, wherein the excess acid is between 4.5 and 5.5% by weight.

\* \* \* \* \*

UNITED STATES PATENT AND TRADEMARK OFFICE
CERTIFICATE OF CORRECTION

PATENT NO.       : 8,679,343 B2
APPLICATION NO.  : 12/991977
DATED            : March 25, 2014
INVENTOR(S)      : Garcia Biosca et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 750 days.

Signed and Sealed this

Twenty-ninth Day of September, 2015

Michelle K. Lee
*Director of the United States Patent and Trademark Office*